US008826677B2

(12) United States Patent
Clodic et al.

(10) Patent No.: US 8,826,677 B2
(45) Date of Patent: Sep. 9, 2014

(54) REFRIGERATION PROCESS AND SYSTEM FOR RECOVERING COLD FROM METHANE BY REFRIGERANTS

(75) Inventors: Denis Clodic, Palaiseau (FR); Mourad Younes, Conflans Sainte-Honorine (FR); Youssef Riachi, Massy (FR)

(73) Assignee: Association Pour la Recherche et le Developpement de Methodes et Processus Industriels "Armines", Paris (FR)

( * ) Notice: Subject to any disclaimer, the term of this patent is extended or adjusted under 35 U.S.C. 154(b) by 225 days.

(21) Appl. No.: 13/263,467

(22) PCT Filed: Mar. 29, 2010

(86) PCT No.: PCT/FR2010/050575
§ 371 (c)(1),
(2), (4) Date: Dec. 20, 2011

(87) PCT Pub. No.: WO2010/116067
PCT Pub. Date: Oct. 14, 2010

(65) Prior Publication Data
US 2012/0079841 A1 Apr. 5, 2012

(51) Int. Cl.
*F25B 1/00* (2006.01)
*B01D 53/00* (2006.01)
*F25J 3/06* (2006.01)

(52) U.S. Cl.
CPC .............. *F25J 3/067* (2013.01); *F25J 2210/62* (2013.01); *F25J 2210/70* (2013.01); *Y02C 10/12* (2013.01); *F25J 2270/14* (2013.01); *B01D 53/002* (2013.01); *F25J 2220/82* (2013.01); *F25J 2270/66* (2013.01); *B01D 2257/504* (2013.01); *F25J 2205/20* (2013.01); *F25J 2270/902* (2013.01); *F25J 2270/12* (2013.01); *F25J 2280/30* (2013.01); *F25J 2270/18* (2013.01)
USPC .............................................. 62/115; 62/498

(58) Field of Classification Search
CPC ............. B01D 53/002; B01D 2257/504; F25J 2210/62; F25J 2220/82; F25J 2270/902; F25J 3/06; F25J 2210/70
USPC ........................ 62/115, 498, 335, 151, 6, 612; 165/104.19, 104.27
See application file for complete search history.

(56) References Cited

U.S. PATENT DOCUMENTS 3,702,063 A    11/1972   Etzbach et al.
3,874,184 A *   4/1975   Harper et al. ................... 62/628

(Continued)

FOREIGN PATENT DOCUMENTS

DE    10 2007 032 536    1/2009
JP    52 016480    2/1977

OTHER PUBLICATIONS

Data WPI Section Ch, Week 197712 Thomson Scientific, London, GB; Class J07, AN 1977-20665Y XP002568397, "Liquefaction of air-after removal of water vapour and carbon dioxide".

*Primary Examiner* — Mohammad M Ali
(74) *Attorney, Agent, or Firm* — Cozen O'Connor

(57) ABSTRACT

A refrigeration system includes a plurality of heat exchangers (E1, E2, E3) in cascade, each of said heat exchangers including: a flow (150) of cold-producing liquefied methane; a high-pressure flow (122) of a two-phase mixture of refrigerant fluids giving up in heat and including refrigerant fluids having a low normal boiling temperature; and a low-pressure flow (100) of a cold-producing two-phase mixture of said refrigerant fluids.

20 Claims, 2 Drawing Sheets

(56) References Cited

U.S. PATENT DOCUMENTS

| | | | |
|---|---|---|---|
| 3,945,214 A * | 3/1976 | Darredeau et al. | 62/48.2 |
| 4,303,427 A * | 12/1981 | Krieger | 62/612 |
| 4,325,231 A * | 4/1982 | Krieger | 62/335 |
| 4,707,170 A * | 11/1987 | Ayres et al. | 62/627 |
| 4,977,745 A * | 12/1990 | Heichberger | 62/619 |
| 5,467,722 A | 11/1995 | Meratla | |
| 6,082,133 A | 7/2000 | Barclay et al. | |
| 6,751,984 B2 * | 6/2004 | Neeraas et al. | 62/612 |
| 2004/0148961 A1 | 8/2004 | Clodic et al. | |
| 2008/0302133 A1 | 12/2008 | Saysset et al. | |

* cited by examiner

REFRIGERATION PROCESS AND SYSTEM FOR RECOVERING COLD FROM METHANE BY REFRIGERANTS

RELATED APPLICATIONS

This is a U.S. National Phase Application under 35 USC §371 of International Application PCT/FR2010/050575, filed on Mar. 29, 2010.

This application claims the priority of French application no. 09/52268 filed on Apr. 7, 2009, the content of which is hereby incorporated by reference.

BACKGROUND OF THE INVENTION

The invention relies in the field of recovering cold at very low temperature, the source of cold being liquid methane under pressure, e.g. obtained when transferring liquefied natural gas from methane tankers.

It should be recalled that methane is usually transported in a tanker at atmospheric pressure, with heat losses being compensated by the methane boiling at atmospheric pressure.

When the tanker reaches its unloading port, the methane is extracted by pumps that compress the liquid methane to a typical pressure of 6 megapascals (MPa).

This liquid phase compression consumes about one-thirtieth of the energy that would be required for compressing the gas phase and it is needed in order to distribute the natural gas in the primary network; it serves to compensate for the head losses associated with the flow of gas over several hundreds of kilometers.

In practice, liquefied methane is transferred under pressure to the distribution network after being heated up to a temperature of about 15° C. in heat exchangers that are immersed in the sea.

The recoverable cold power amounts to tens of megawatts.

At present very little use is made of that cold.

In a preferred but non-limiting embodiment, the invention proposes using the cold recovered from methane to capture the $CO_2$ contained in flue gas, or more generally in any gas, by frosting.

The person skilled in the art will understand that this use imposes a particular constraint, given that the flow rates of the methane and of the gas conveying $CO_2$ are independent.

The invention thus seeks to provide a system for recovering cold from methane obtained by liquid phase compression and suitable for use in capturing $CO_2$ by frosting, in which the flow rate of methane and of the $CO_2$-conveying gas are considered as being completely uncorrelated.

Documents US 2007/0186563 and WO 02/060561 respectively describe a method of recovering cold from methane, and a refrigeration method for capturing $CO_2$ from the flue gases of energy production units.

OBJECT AND SUMMARY OF THE INVENTION

In a first aspect, the invention provides a refrigeration system comprising a plurality of heat exchangers in cascade, each of said heat exchangers including:
 a flow of cold-producing liquefied methane;
 a high-pressure flow of a two-phase mixture of refrigerant fluids giving up its heat and including refrigerant fluids having a low normal boiling temperature; and
 a low-pressure flow of a cold-producing two-phase mixture of said refrigerant fluids.

In a particular embodiment of the invention, the above-mentioned boiling temperature typically lies in the range −80° C. to −160° C.

The invention thus makes it possible to recover the cold from liquefied methane in heat exchangers of a cascade that is incorporated in a refrigeration system using a mixture of refrigerant fluids.

It is characterized by the fact that the liquid methane gives up its cold by evaporating or by transferring its liquid or gaseous sensible heat in heat exchangers through which at least three different flows pass: the methane flow, a condensing flow of a mixture of refrigerant fluids; and an evaporating flow of a mixture of refrigerant fluids.

It is also characterized in that the system of the invention for recovering cold from liquefied methane includes heat exchangers handling two cold-producing flows, in other words absorbing heat, and one heat-supplying flow.

The methane may be under supercritical pressure or under subcritical pressure. It flows through the heat exchangers as a counterflow relative to the two-phase mixture of refrigerant fluids that condenses or subcools.

The methane heats up in the supercritical domain or it evaporates in the two-phase domain when the methane is under subcritical pressure.

In parallel with this cooling, and in the same heat exchanger, the flow of a mixture of refrigerant fluids that condenses is also cooled in part by a fraction of the flow of the mixture of refrigerant fluids.

In a preferred embodiment, the refrigeration system of the invention includes at least one separator for obtaining a pressurized liquid phase of the mixture of refrigerant fluids, an expander suitable for causing the pressure of the liquid phase to drop, and means for redirecting at least a portion of the expanded liquid phase into the low-pressure flow of a mixture of cold-producing refrigerant fluids.

This characteristic enables the low-pressure flow in a heat exchanger of the cascade to be adjusted, and thus makes it possible to adjust the level of condensation and the temperature of the high-pressure flow in said heat exchanger.

In a particular embodiment of the invention, the refrigeration system of the invention includes:
 means for expanding said cooled high-pressure flow at the outlet from said cascade and for directing at least a portion thereof to at least one refrigeration heat exchanger passing a gas including $CO_2$, said heat exchanger operating in a frosting cycle.

In a particular embodiment, the refrigeration system of the invention includes:
 means for obtaining a liquid phase from the high-pressure flow for cooling; and
 means for expanding the liquid phase and directing at least a portion thereof into the at least one refrigeration heat exchanger, the heat exchanger operating in a defrosting cycle.

At least a portion of the mixture of refrigerant fluids obtained at the outlet from the refrigeration heat exchanger operating in a defrosting cycle may advantageously be used to top up the low-pressure flow of a mixture of refrigerant fluids at the inlet to at least one heat exchanger of the cascade.

In a particular embodiment, the heat exchangers are controlled to operate in alternation in a frosting cycle and in a defrosting cycle.

The invention thus enables $CO_2$ to be captured by antisublimation on the refrigeration heat exchangers that operate in alternation in frosting mode and in defrosting mode. It thus constitutes an improvement of the integrated cascade system described in document WO 02/060561.

In a particular embodiment, the low-pressure flow introduced into the cascade is obtained from the flow of a mixture of refrigerant fluids at the outlet from the refrigeration heat exchanger when it is operating in a frosting cycle.

In a particular embodiment, the refrigeration system of the invention includes means for recovering a portion of the liquid phase of the low-pressure flow of a mixture of refrigerant fluids at the outlet from the refrigeration heat exchanger.

This characteristic constitutes an additional element for regulation that is needed when the flow rate of methane (that needs to be heated from −158° C. to +15° C.) is in excess relative to the refrigeration needs of the system.

In a particular embodiment, the refrigeration system of the invention includes:
- means for compressing the high pressure liquid phase;
- at least one evaporator suitable for vaporizing the high pressure liquid phase as obtained in this way; and
- a turbine suitable for expanding the high pressure vapor as obtained in this way in order to produce mechanical energy.

In a particular embodiment, the refrigeration system of the invention includes:
- a variable-frequency compressor suitable for compressing the low-pressure flow at the outlet from the cascade; and
- a partial condenser suitable for condensing the mixture of refrigerant fluids compressed by the compressor in order to regenerate the high-pressure flow for introduction into the cascade.

In a particular embodiment, this partial condenser is an evaporator/condenser used to vaporize the high-pressure liquid phase before expansion in the turbine.

In most advantageous manner, cold recovery can be modulated as a function of the operation of the $CO_2$ capture system and of the availability of the methane cold flow rate.

The refrigeration system of the invention is in particular suitable for operating:
- at full load of the $CO_2$ capture system in order to handle a nominal flow rate of gas or flue gas, with nominal recovery of cold from the methane;
- at full load of the $CO_2$ capture system with reduced recovery of cold from the methane; or
- at reduced load of the $CO_2$ capture system with nominal recovery of cold from the methane.

In most advantageous manner, the refrigeration system of the invention is always capable of heating the methane, regardless of the flow rate of the methane and regardless of the flow rate of gas or flue gas handled by the $CO_2$ capture refrigeration system.

More precisely, if the flow rate of methane is reduced to zero, the heat exchangers operate solely between the fraction of the flow of the mixture that evaporates and the fraction of the mixture that condenses.

In contrast, as soon as the methane flow rate is greater than zero, the evaporation rate of the mixture of refrigerant fluids is adapted, but the mixture continues to flow, and if the cold from the methane is in excess relative to the needs of the refrigeration system, the methane is nevertheless still heated up and the excess cold is transformed into mechanical energy that is produced by the mixture of refrigerant fluids.

It should be recalled that in order to transport methane after it has been extracted from the subsoil, use is made either of transport by pipeline or transport by methane tanker.

The first solution requires a large amount of energy to be extended to compress the methane in the gaseous phase over hundreds of kilometers by means of compression stations.

For the second solution, it is necessary to expend energy in order to cool the methane down to −161° C. by means of a refrigeration system that consumes enormous amounts of energy. This cold continues to be available when the methane is transferred. By recovering the cold from the methane in the heat exchangers of the integrated cascade, the invention enables a large amount of energy to be saved, which energy no longer needs to be produced by the compressor.

The invention also provides a method of recovering cold from a flow of liquefied methane, in which the said flow is caused to pass through a plurality of heat exchangers also having a high-pressure flow of a two-phase mixture of refrigerant fluids passing therethrough giving up its heat and including refrigerant fluids having a low normal boiling temperature, and having a low-pressure flow of a two-phase mixture of said refrigerant fluids passing therethrough and producing cold.

The particular advantages and characteristics of this method of recovering cold from a flow of liquefied methane are identical to those of the refrigeration system of the invention and are not repeated here.

BRIEF DESCRIPTION OF THE DRAWINGS

Other characteristics and advantages of the present invention appear from the following description made with reference to FIGS. 1 and 2, in which.

DETAILED DESCRIPTION OF THE DRAWINGS

Figure 1:
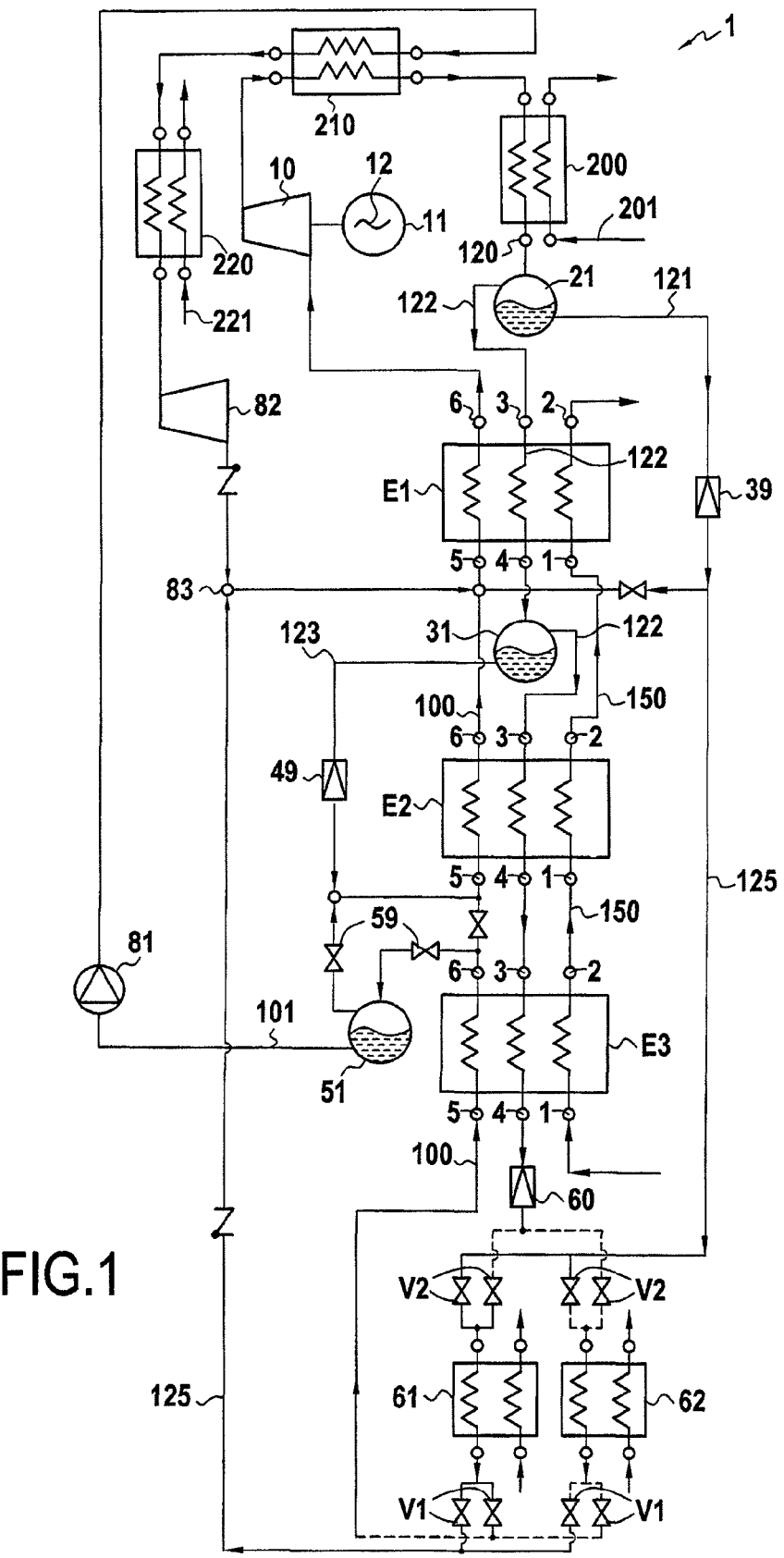
FIG. 1 shows a refrigeration system in a particular embodiment of the invention.
Figure 2:
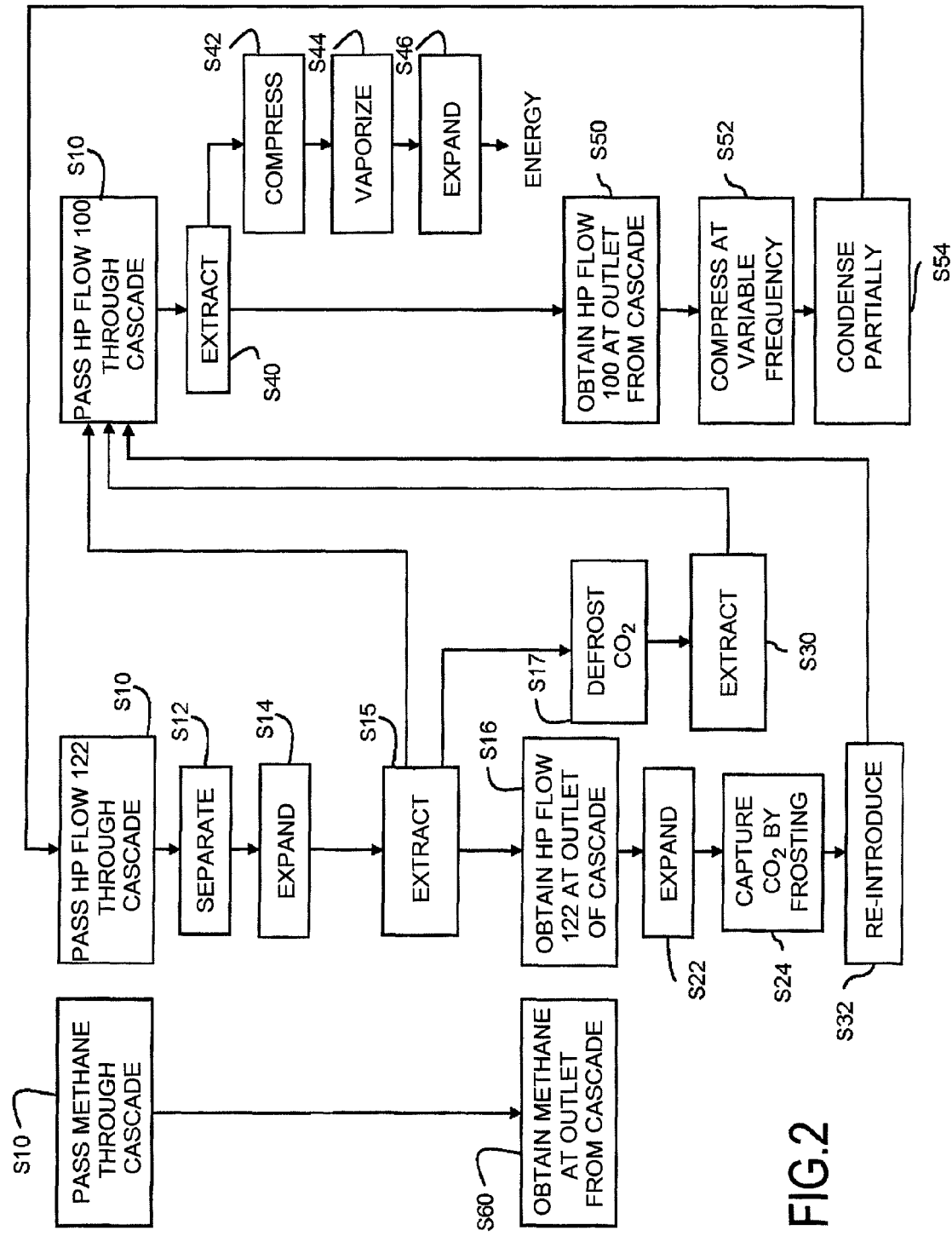
FIG. 2 is a flow chart showing the main steps of a method of recovering cold from a flow of liquefied methane in a particular implementation of the invention.

FIG. 1 shows a refrigeration system in a particular embodiment of the invention. FIG. 2 shows a method of recovering cold from a flow of liquefied methane in accordance with a particular implementation of the invention.

In the embodiment described herein, the refrigeration system 1 comprises three heat exchangers E1, E2, and E3 in cascade.

In accordance with the invention, each of these heat exchangers passes three flows, namely:
- a flow 150 of cold-supplying methane that enters the heat exchanger E1, E2, E3 via an inlet 1 and that leaves via an outlet 2;
- a high-pressure flow 122 of a mixture of refrigerant fluids that enters the heat exchanger E1, E2, E3 via an inlet 3, that condenses partially or completely, and that leaves via an outlet 4; and
- a low-pressure flow 100 of a mixture of the same refrigerant fluids, that enters the heat exchanger E1, E2, E3 via an inlet 5, that evaporates, and that leaves via an outlet 6.

In the embodiment described herein, the high-pressure flow 122 of the mixture of refrigerant fluids flows through each of the heat exchangers E1, E2, E3 as a counterflow to the flow 150 of methane and to the low-pressure flow 100 of the mixture of refrigerant fluids. The passage of these three flows through the cascade is given reference S10 in FIG. 2.

The methane may either be at a pressure that is higher than its critical pressure (4.56 MPa), or at a subcritical pressure.

When the methane is at a supercritical pressure, it is either in a subcooled liquid state or in a dense gaseous state.

The methane sucked in by the pump system at −161° C. at a pressure of 0.1 MPa is compressed at the outlet from the methane tanker to pressures that are typically 6 MPa to 8 MPa, greater than the critical pressure. The temperature rise associated with this compression in the liquid phase is extremely limited, typically 3 kelvins (K).

After being compressed, methane is thus available at a temperature of about −158° C. and a pressure of 6 MPa or 8 MPa.

In the embodiment described herein, the flow 150 of supercritical methane passes thorough the heat exchangers E3, E2, E1 in cascade, and in that order.

The flow 150 of supercritical methane and the low-pressure flow 100 of the mixture of refrigerant fluids are heated, while the high-pressure flow 112 of refrigerant fluids is cooled, absorbing cold from the other two flows 150 and 100.

The heat exchanges between the methane 150 and the high-pressure flow 122 of the mixture of refrigerant fluids may be as follows:
- either supercritical methane and a two-phase mixture of refrigerant fluids condensing;
- or supercritical methane and a mixture of liquid refrigerant fluids subcooling.

In the embodiment described herein, the flow 150 of methane heats from about −158° C. (inlet temperature to the heat exchanger E3) to about +15° C. (outlet temperature from the heat exchanger E1).

On passing from −158° C. to about 15° C., the methane gives up about 800 kilojoules per kilogram (kJ/kg).

The cold of the methane can thus be recovered (step S60) at a subcritical pressure, e.g. 3.2 MPa when the methane is injected as fuel into a turbine. In this embodiment, the methane gives up about:
- 250 kJ/kg from −153° C. to −94° C. (heating the subcooled liquid methane up to the saturated liquid point);
- 250 kJ/kg by evaporating at −94° C.; and
- 190 kJ/kg from −94° C. to +15° C.

In any event, it is important not to forget that, in most applications, the flow rate of the methane flow 150 is not a variable available for control purposes.

The high-pressure flow 122 of the mixture of refrigerant fluids comprises refrigerant fluids having a low normal boiling temperature, such as methane, ethane, or ethylene.

In the embodiment described herein, the mixture 122 comprises 15% methane, 30% ethane, 15% propane, and 40% butane.

In the embodiment described herein, the refrigeration system 1 of the invention includes a partial condenser 200 upstream from the heat exchanger E1, suitable for producing a mixture of refrigerant fluids 120 in a two-phase state, e.g. at a temperature of 20° C. and at the high pressure of the refrigeration system 1, of the order of 2 MPa to 2.5 MPa.

In the embodiment described herein, the condenser 200 uses a flow of water 201 to cool and condense in part the mixture of refrigerant fluids 120.

In the embodiment described herein, the refrigeration system 1 of the invention includes a separator 21 at the outlet from the partial condenser 200 and suitable for separating (step S12) the vapor phase 122 and the liquid phase 121 of the two-phase mixture 120.

Only the vapor phase 122 enters the heat exchanger E1 via its inlet 3.

In accordance with the invention, the flow 122 of vapor through the heat exchanger E1 flows past the flow 150 of methane and the low-pressure flow 100 of a mixture of refrigerant fluids.

The high-pressure flow 122 of vapor condenses in part in the heat exchanger E1 and leaves it via the outlet 4 in a two-phase state.

In the embodiment described herein, the flow 122 of vapor enters into the heat exchanger E1 at a temperature of about 20° C. and leaves it at a temperature that is typically −45° C.

In the embodiment described herein, the refrigeration system 1 includes another separator 31 suitable for separating (step S12) the vapor phase 122 and the liquid phase 123 of the two-phase mixture at the outlet 4 of the heat exchanger E1.

The flow 122 of vapor at the outlet from the separator 31 enters into the heat exchanger E3 via its inlet 3.

The high-pressure flow 122 of vapor condenses in the heat exchanger E2 on meeting the flow 150 of methane, and the low-pressure flow 100 of the mixture of refrigerant fluids.

In the embodiment described herein, this condensation is partial.

In the embodiment described herein, the flow 122 of vapor enters into the heat exchanger E2 at a temperature of about −45° C. and leaves it in a two-phase state at a temperature that is typically −80° C., after taking up cold from the flow 150 of methane and from the low-pressure flow 100 of the mixture of refrigerant fluids that evaporate.

In the embodiment described herein, the outlet 4 from the heat exchanger E2 is connected directly to the inlet 3 of the heat exchanger E3. There is no need to use a separator between the heat exchangers E2 and E3, the cold available from the flows 100 and 150 sufficing to finish off condensing the flow 122.

In the embodiment described herein, the two-phase flow 122 enters into the heat exchanger E3 at a temperature of about −80° C. and leaves it (step S16) in the liquid state after complete condensation at a temperature typically of −100° C., after being cooled on contacting the flow 150 of methane and the low-pressure flow 100 of the mixture of refrigerant fluids.

As stated above, in the embodiment described herein, the low-pressure flow 100 passes through the cascade of heat exchangers as a counterflow to the high-pressure flow 122 of the mixture of refrigerant fluids.

This flow thus passes in succession through the heat exchangers E3, E2, and E1, in that order.

In the embodiment described herein, the low-pressure flow 100 comes in alternation from a heat exchanger 61 or 62 operating in a frosting cycle (step S24), as described below.

In the embodiment described herein, a set of four valves V1 serves to connect the outlet of one or the other of the heat exchangers 61 or 62 to the inlet 5 of the heat exchanger E3 in order to introduce (step S32) the low-pressure flow 100 into the cascade.

In the embodiment described herein, the flow 100 of the low-pressure mixture of refrigerant fluids enters into the heat exchanger E3 in the vapor phase or with a small quantity of liquid.

In accordance with the invention, the flow 100 of the low-pressure mixture is heated in the heat exchanger E3 in contact with the high-pressure flow 122 of the mixture of refrigerant fluids.

In the embodiment described herein, the refrigeration system 1 of the invention includes means for regulating the low-pressure flow 100 at the inlets 5 of the heat exchangers E2 and E3.

More precisely, in the embodiment described herein, the refrigeration system 1 of the invention includes means for diverting (step S15) at least a portion of the liquid phase 123 obtained by the separator 31 into the low-pressure flow 100 that enters at 5 into the heat exchanger E2.

In accordance with the invention, the liquid phase 123 obtained by the separator 31 is at high pressure (in the range 2 MPa to 2.5 MPa), identical to the delivery pressure from the compressor, ignoring head losses.

In the embodiment described herein, the refrigeration system 1 of the invention consequently includes a expander-regulator 49 for causing the pressure of said liquid phase 123 to drop (step S14) before being introduced into the heat exchanger E2.

The regulator 49 thus serves to adapt the low-pressure flow 100 through the heat exchanger E2, thereby making it possible to adjust the level of partial condensation of the high-pressure flow 122 and to maintain its temperature at the desired value of −80° C. at the outlet 4 from this heat exchanger.

In the same manner, the refrigeration system 1 of the invention in this embodiment also includes an expander-regulator 39 suitable for expanding (step S14) a portion of the high pressure liquid phase 121 obtained by the separator 21, and a pipe for directing (step S15) the low pressure liquid phase as obtained in this way into the low-pressure flow 100 that is introduced into the heat exchanger E1.

This expander-regulator 39 thus serves to adapt the low-pressure flow 100 through the heat exchanger E1 to adjust the level of condensation of the high-pressure flow 122 and maintain its temperature at the desired value of −45° C. at the outlet 4 from this heat exchanger.

In the embodiment described herein, the low-pressure flow 100 obtained (step S50) at the outlet from the cascade E3, E2, E1 is compressed (step S52) by a compressor 10 and is partially condensed (step S54) in order to regenerate the high pressure mixture 120 of refrigerant fluids upstream from the above-described partial condenser 200.

In the embodiment described herein, the refrigeration system 1 of the invention includes a variable frequency circuit 12 that adapts the speed of rotation of an electric motor 11 that drives the compressor 10 of the refrigeration system 1.

This variable frequency circuit 12 serves to regulate the flow 120 of the mixture of refrigerant fluids through the cascade E1, E2, E3.

It is recalled that in the embodiment described herein, the low-pressure flow 100 at the inlet to the cascade E3, E2, E1 is obtained by heat exchangers 61 and 62 operating in a frosting cycle (step S24), the operation of which is described below.

In the embodiment described herein, the cold from the methane is used indirectly to capture $CO_2$.

In the embodiment described herein, the $CO_2$ is captured by antisublimation on the refrigeration heat exchangers 61, 62 that operate in alternation in frosting mode and in defrosting mode, in application of the principle set out in document WO 02/060561.

In the embodiment described herein, in order to frost $CO_2$, the flow 122 of the mixture of refrigerant fluids at the outlet from the cascade and at a typical temperature of −100° C. is caused to flow through the refrigeration heat exchanger 61 (or 62) with this flow 122 being previously biased in pressure by an expander 60 placed at the outlet of the cascade (step S22).

And in order to defrost the $CO_2$ that is deposited on the refrigeration heat exchanger 61 (or 62), a fraction 125 of the liquid phase 121 taken (step S15) from the outlet of the separator 21 is caused to flow through said heat exchanger after being expanded (step S14) by the above-described expander-regulator 39.

As stated above, the temperature of the liquid phase 121 at the outlet from the separator 21 is about 20° C.

In the embodiment described herein, the temperature of the defrosting flow 125 at the outlet from the expander 39 is about −40° C., given the high concentration of refrigerant fluids having a low normal boiling temperature (ethane, methane) and the vapor content is relatively high, being greater than 30%.

In the embodiment described herein, valves V2 allow the following to be caused to circulate in alternation (specifically once every 10 minutes) through each of the heat exchangers 61, 62:

the high-pressure flow 122 that generates cold by evaporating ($CO_2$ frosting cycle); and the high-pressure flow 125 taken from the heat generator ($CO_2$ defrosting cycle).

As stated above, in the embodiment described herein, the high-pressure flow 122 obtained at the outlet from the heat exchangers 61, 62 in the frosting cycle constitutes the low-pressure flow 100 introduced into the inlet 5 of the heat exchanger E1.

In the embodiment described herein, the low-pressure flow in the liquid phase obtained at the outlet from the heat exchangers 61, 62 in the defrosting cycle passes via a node 83 and is reincorporated into the inlet 5 of the heat exchanger E1. Its temperature is variable and typically lies in the range −80° C. to −50° C.

In the embodiment described herein, the refrigeration system 1 of the invention includes a complementary regulation element that is needed when the flow of methane (which needs to be heated from −158° C. to +15° C.) is in excess relative to the refrigeration needs of the system 1.

In the embodiment described herein, the refrigeration system 1 includes a temperature probe for measuring the temperature of the low-pressure flow 100 at the outlet 6 from the heat exchanger E1 in order to detect such an excess. If the refrigeration power of the high-pressure flow 122 that enters into a refrigeration heat exchanger 61, 62 in the frosting cycle is well above requirements for frosting, then the two-phase low-pressure flow 100 as re-inserted into the heat exchanger E1, after passing through said heat exchanger 61, 62 will present a high liquid content. It will evaporate in the heat exchanger E3 and its outlet temperature, as measured by the above-mentioned thermometer, will be much lower than usual.

In the embodiment described herein, the excess 101 of liquid is separated (step S40) by a separator 51 at the outlet 6 from the heat exchanger E3, compressed by a pump 81 (step S42) and sent at high pressure to an evaporator system 210, 220 where it evaporates (step S44), expands (step S46) through a turbine 82 that delivers mechanical or electrical energy, and is then reincorporated via the node 83 at the inlet 5 of the heat exchanger E1 in addition to the low-pressure flow 100 from the outlet 6 of the heat exchanger E2.

In the embodiment described herein, the evaporation of the high-pressure flow 101 takes place in two stages.

More precisely, a first evaporation stage is advantageously performed in a partial evaporator/condenser 210 connected in series between the outlet from the compressor 10 and the inlet of the partial condenser 200 so that this first evaporation of the high-pressure flow 101 allows partial condensation (step S54) of the compressed mixture of refrigerant fluids 120 (step S52) by the compressor 10.

In the embodiment described herein, the high-pressure flow 101 ends up by evaporating in an evaporator 220 where the heater fluid 221 is air and water or a processed fluid.

In the embodiment described herein, the flow 101 is at a high pressure that is not less than the high pressure of the refrigeration system 1.

This regulation enables the refrigeration system 1 of the invention to operate in operating ranges in which the flows external to the system vary, i.e. the flow of fumes or process gases for treatment and the flow of methane that needs to be heated.

The invention claimed is:

1. A refrigeration system comprising a plurality of heat exchangers in cascade, each of said heat exchangers comprising;
   a flow of cold-producing liquefied methane;
   a high-pressure flow of a two-phase mixture of refrigerant fluids giving up its heat and including refrigerant fluids having a low normal boiling temperature;
   a low-presssure flow of a cold-producing two-phase mixture of said refrigerant fluids;
   means for expanding said cooled high-pressure flow at the outlet from said cascade and for directing at least a portion thereof to at least one refrigeration heat exchanger passing a gas including $CO_2$, said heat exchanger operating in a frosting cycle;
   means for obtaining a liquid phase from said high-pressure flow for cooling; and
   means for expanding said liquid phase and directing at least a portion thereof into said at least one refrigeration heat exchanger, said heat exchanger operating in a defrosting cycle.

2. The refrigeration system according to claim 1, comprising one separator for obtaining a pressurized liquid phase of said mixture of refrigerant fluids, an expander suitable for causing the pressure of said liquid phase to drop, and means for redirecting at least a portion of said expanded liquid phase into said low pressure flow of a mixture of cold-producing refrigerant fluids.

3. The refrigeration system according to claim 1, comprising:
   a variable frequency compressor suitable for compressing said low-pressure flow at the outlet from said cascade: and
   a partial condenser suitable for condensing the mixture of refrigerant fluids compressed by said compressor in order to regenerate said high-pressure flow for introduction into said cascade.

4. The refrigeration system according to claim 1, wherein at least a portion of the mixture Of refrigerant fluids obtained at the outlet from said refrigeration heat exchanger operating in a defrosting cycle is used to top up said low-pressure flow of a mixture of refrigerant fluids at the inlet to at least one heat exchanger of said cascade, 5. A refrigeration system comprising a plurality of heat exchangers in cascade, each of said heat exchangers comprising:
   a flow of cold-producing liquefied methane;
   a high-pressure flow of a two-phase mixture of refrigerant fluids giving up its heat and including refrigerant fluids having a low normal boiling temperature;
   a low-pressure flow of a cold-producing two-phase mixture of said refrigerant fluids; and
   means for expanding said cooled high-pressure flow at the outlet from said cascade and for directing at least a portion thereof to at least one refrigeration heat exchanger passing a gas including $CO_2$, said heat exchanger operating in a frosting cycle,
   wherein said low-pressure flow introduced into said cascade is obtained from the flow of a mixture of refrigerant fluids at the outlet from said refrigeration heat exchanger when it is operating in a frosting cycle.

6. The refrigeration system according to claim 5, comprising one separator for obtaining a pressurized liquid phase of said mixture of refrigerant fluids, an expander suitable for causing the pressure of said liquid phase to drop, and means for redirecting at least a portion of said expanded liquid phase into said low-pressure flow a mixture of cold-producing refrigerant fluids.

7. The refrigeration system according to claim 5, comprising:
   a variable frequency compressor suitable for compressing said low-pressure flow at the outlet from said cascade; and
   a partial condenser suitable for condensing the mixture of refrigerant fluids compressed by said compressor in order to regenerate said high-pressure flow for introduction into said cascade.

8. The system according to claim 5, comprising means for recovering a portion of the liquid phase of the low-pressure flow a mixture of refrigerant fluids at the outlet from said refrigeration heat exchanger.

9. The system according to claim 8, comprising:
   means for compressing said high pressure liquid phase;
   at least one evaporator suitable for vaporizing said high pressure liquid phase as obtained in this way; and
   a turbine suitable for expanding said high pressure vapor obtained in this way in order to produce mechanical energy.

10. A method of recovering cold from a flow of liquefied methane, wherein said flow is caused to flow through a plurality of heat exchangers also having flowing therethrough a high-pressure flow of a two-phase mixture of refrigerant fluids giving up its heat and including refrigerant fluids having low normal boiling temperatures, and by a cold producing low-pressure flow of a mixture of said two-phase refrigerant fluids, comprising the steps of:
    expanding said cooled high-pressure flow obtained at the outlet from said cascade; and
    using at least a portion thereof in order to capture $CO_2$ by frosting.

11. The method according to claim 10, comprising the steps of:
    separating said mixture of refrigerant fluids to obtain a pressurized liquid phase of the refrigerant fluid mixture;
    expanding the liquid phase as obtained in this way; and
    taking therefrom at least a portion after expansion and redirecting it into said cold producing low-pressure flow of a mixture of refrigerant fluids.

12. The method according to claim 10, comprising the steps of:
    obtaining a liquid phase from said high-pressure flow that gives up its heat; and
    expanding at least a portion thereof for use in defrosting the $CO_2$.

13. The method according to claim 12, comprising taking at least a fraction of the mixture of refrigerant fluids used for said defrosting in order top up said low-pressure flow introduced into at least one heat exchanger.

14. The method according to claim 10, wherein the low-pressure flow introduced into the cascade is obtained from the flow of a mixture of refrigerant fluids that have been used for said frosting.

15. The method according to claimed 14, comprising taking a portion of the liquid phase of said high-pressure flow introduced into the cascade.

16. The method according to claim 15, comprising the steps of;
    compressing said liquid phase under high pressure;
    vaporizing the high pressure liquid phase as obtained in this way; and expanding it in a turbine in order to produce mechanical energy.

17. The method according to claim 10, comprising the steps of:
    compressing at variable frequency the low-pressure flow obtained at the outlet from said cascade; and
    partially condensing the mixture of refrigerant fluids as compressed in this way in order to regenerate said high-pressure flow introduced into said cascade.

18. The method according to claimed 12, comprising the steps of:
    separating said mixture of refrigerant fluids to obtain a pressurized liquid phase of the refrigerant fluid mixture;
    expanding the liquid phase as obtained in this way; and
    taking therefrom at least a portion after expansion and redirecting it into said cold producing low-pressure flow of a mixture of refrigerant fluids.

19. The method according to claim 12, comprising the steps of;
    compressing at variable frequency the low-pressure flow obtained at the outlet from said cascade; and
    partially condensing the mixture of refrigerant fluids as compressed in this way in order to regenerate said high-pressure flow introduced into said cascade.

20. The method according to claim 14, comprising the steps of;
    separating said mixture of refrigerant fluids to obtain a pressurized liquid phase of the refrigerant fluid mixture;
    expanding the liquid phase as obtained in this way; and
    taking therefrom at least a portion after expansion and redirecting it into said cold producing low-pressure flow of mixture of refrigerant fluids.

* * * * *